United States Patent
Pitzal et al.

(10) Patent No.: US 8,205,605 B2
(45) Date of Patent: Jun. 26, 2012

(54) METHOD FOR OPERATING AN INTERNAL COMBUSTION ENGINE

(75) Inventors: Volker Pitzal, Waldstetten/Wissgoldingen (DE); Wolfram Gerwing, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 12/304,142

(22) PCT Filed: Nov. 14, 2007

(86) PCT No.: PCT/EP2007/062311
§ 371 (c)(1),
(2), (4) Date: May 19, 2009

(87) PCT Pub. No.: WO2008/058980
PCT Pub. Date: May 22, 2008

(65) Prior Publication Data
US 2009/0320793 A1    Dec. 31, 2009

(30) Foreign Application Priority Data
Nov. 15, 2006  (DE) .................. 10 2006 053 807

(51) Int. Cl.
*F02D 41/00* (2006.01)
(52) U.S. Cl. .............. 123/676; 701/111; 123/672
(58) Field of Classification Search .......... 701/110, 701/111; 123/406.23, 339.1, 339.24, 434, 123/435, 672, 676
See application file for complete search history.

(56) References Cited

U.S. PATENT DOCUMENTS

| | | | |
|---|---|---|---|
| 5,542,379 A * | 8/1996 | Kessler | 123/25 C |
| 6,332,452 B1 | 12/2001 | Debusmann et al. | |
| 6,539,704 B1 * | 4/2003 | Surnilla et al. | 60/274 |
| 6,813,879 B2 * | 11/2004 | Wagner et al. | 60/284 |
| 6,898,928 B2 * | 5/2005 | Wagner et al. | 60/285 |
| 7,025,039 B2 * | 4/2006 | Bidner et al. | 123/339.11 |
| 7,043,352 B2 * | 5/2006 | Miura | 701/104 |
| 7,168,238 B2 * | 1/2007 | Wagner et al. | 60/284 |
| 2002/0189234 A1 * | 12/2002 | Sumilla et al. | 60/274 |
| 2004/0011029 A1 * | 1/2004 | Wagner et al. | 60/295 |

FOREIGN PATENT DOCUMENTS

| | | |
|---|---|---|
| DE | 199 46 962 | 1/2001 |
| DE | 103 04 113 | 8/2004 |
| DE | 103 05 092 | 8/2004 |
| EP | 1 045 235 | 10/2000 |
| GB | 2 357 153 | 6/2001 |
| GB | 2 398 396 | 8/2004 |
| WO | WO 2005/021315 | 3/2005 |

OTHER PUBLICATIONS

International Search Report and Written Opinion of the International Searching Authority, PCT/EP2007/062311 dated Feb. 15, 2008 (English-language translation provided).

* cited by examiner

*Primary Examiner* — John Kwon
(74) *Attorney, Agent, or Firm* — Kenyon & Kenyon LLP

(57) ABSTRACT

In a method for operating an internal combustion engine, in particular of a motor vehicle, the internal combustion engine is controlled by at least one drive variable, and an instantaneous torque output by the internal combustion engine is determined from a performance variable of the internal combustion engine that differs from the drive variable. To determine the instantaneous torque, an exhaust-gas temperature of the internal combustion engine is used as performance quantity that differs from the drive variable.

11 Claims, 2 Drawing Sheets

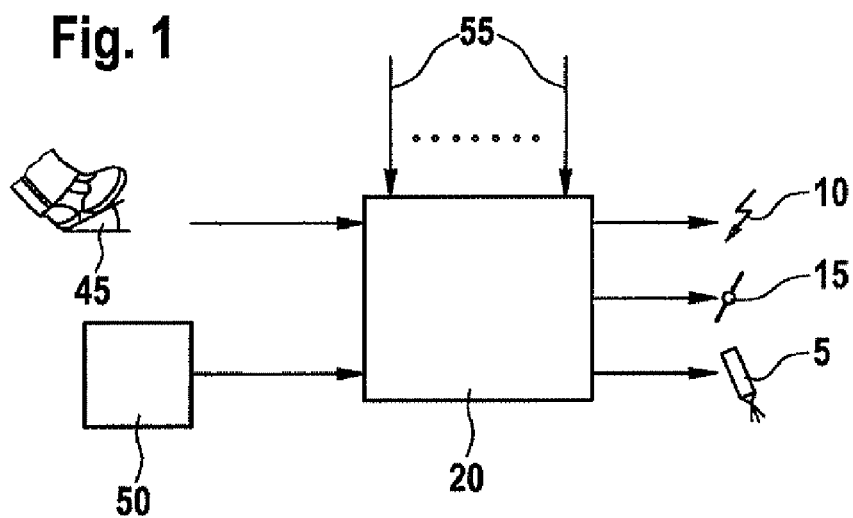
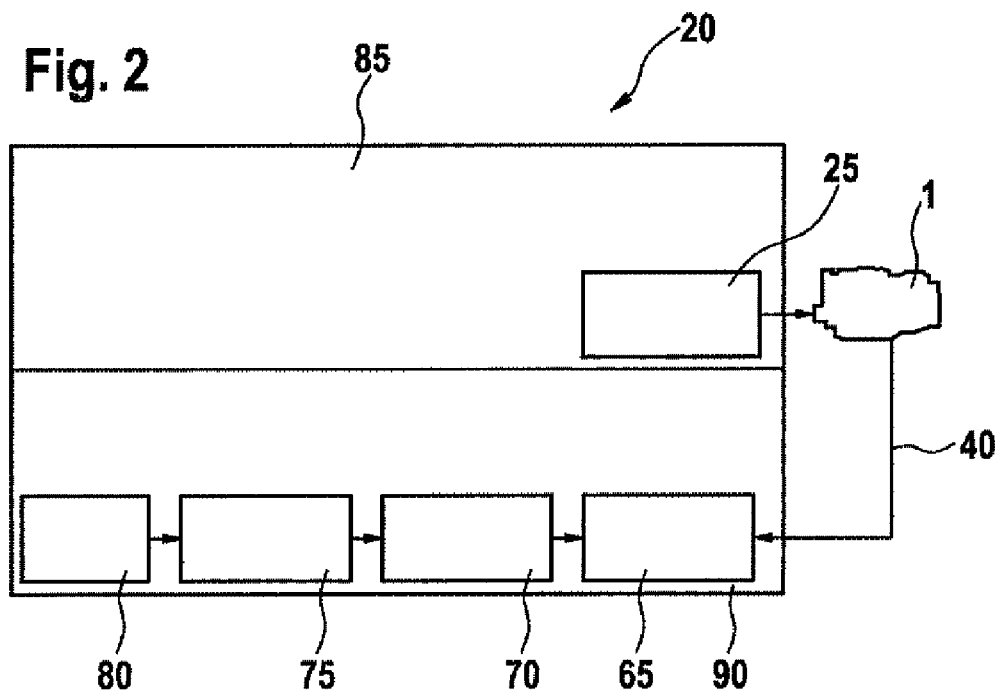

METHOD FOR OPERATING AN INTERNAL COMBUSTION ENGINE

FIELD OF THE INVENTION

The present invention relates to a method for operating an internal combustion engine, in particular of a motor vehicle, in which the internal combustion engine is controlled by at least one drive variable, and in which an instantaneous torque output by the internal combustion engine is determined from a performance quantity of the internal combustion engine that differs from the drive variable.

BACKGROUND INFORMATION

DE 103 04 113 describes a method in which the instantaneous torque is determined from an engine-speed signal of the internal combustion engine. Taking the engine-speed signal into account basically makes it possible to detect torque-increasing errors, i.e., errors that cause an undesired rise in the instantaneous torque output by the internal combustion engine. Especially torque-increasing errors that occur outside the controller, such as the undesired combustion of foreign substances etc., can be detected as well. However, the measuring chain in evaluating the engine-speed signal or in determining the engine speed of the internal combustion engine is relatively long, which has a negative effect on the accuracy of the obtained engine-speed values and thus also on the determination of the instantaneous torque. The evaluation of the pressure signal of a sensor that measures the internal pressure inside the cylinder is similarly complex and, in addition, requires the presence of at least one such sensor to measure the internal pressure inside the cylinder.

SUMMARY

Example embodiments of the present invention provide an operating method for an internal combustion engine by which torque-increasing errors are able to be detected in a relatively simple manner, in particular also torque-increasing errors that occur outside of the controller.

In the method an exhaust-gas temperature of the internal combustion engine is used as a performance quantity to determine the instantaneous torque, the performance quantity differing from the drive variable.

According to example embodiments of the present invention, it is recognized that the exhaust-gas temperature of the internal combustion engine correlates directly with an instantaneous torque output by the internal combustion engine. The operating method according to example embodiments of the present invention advantageously utilizes this correlation to determine the instantaneous torque output by the internal combustion engine. An advantage over conventional methods is that a measuring chain on which the detection of the exhaust-gas temperature of the internal combustion engine is based is relatively short and therefore allows a precise determination of the exhaust-gas temperature and thus the instantaneous torque. Furthermore, in contrast to the conventional methods, which are based on measuring the internal cylinder pressure, no additional sensor is required because an already installed exhaust-gas temperature sensor of the internal combustion engine may be used to implement the method according to example embodiments of the present invention.

Even greater precision or error tolerance in the determination of the instantaneous torque is able to be achieved in that, apart from determining the instantaneous torque as a function of the exhaust-gas temperature, the instantaneous torque of the internal combustion engine is additionally determined as a function of further performance quantities that differ from the drive variable of the internal combustion engine.

The instantaneous torques determined as a function of performance quantities that differ from the drive variable of the internal combustion engine advantageously allow a mutual plausibility check, which further increases the accuracy in the determination of the instantaneous torque.

To detect an undesired acceleration of the internal combustion engine, for example, the instantaneous torque may advantageously be monitored with regard to an agreement with a setpoint torque.

As soon as a specifiable permitted deviation of the instantaneous torque from the setpoint torque is exceeded, or if a plausibility check of instantaneous torques was unsuccessful, an error response may advantageously be initiated according to example embodiments of the present invention, whose goal it is, for instance, to reestablish a reliable operating state of the internal combustion engine, in particular to initiate an operation under emergency conditions and the like.

In addition, the instantaneous torque output by the internal combustion engine may also be determined from the at least one drive variable of the internal combustion engine. Although an instantaneous torque obtained in this manner is by itself unable to allow the detection of torque-increasing errors outside of a control of the internal combustion engine, it may advantageously be utilized in conjunction with the instantaneous torque determined from the exhaust-gas temperature for a plausibility check according to example embodiments of the present invention.

If the exhaust-gas temperature is detected with the aid of at least one exhaust-gas temperature sensor, an error response will be initiated according to example embodiments of the present invention if a malfunction of the exhaust-gas temperature sensor is detected. Such an error response may advantageously also be initiated if, for instance, the exhaust-gas temperature sensor is deinstalled or if its absence is detected.

Of particular importance is the implementation of the method according to example embodiments of the present invention in the form of a computer program which is able to be run on a computer or a processing unit of a control device, and which is suitable to execute the method. The computer program may be stored on an electronic storage medium, for example, the storage medium in turn being part of the control device, for example.

Further advantages, features and details result from the following description, in which exemplary embodiments of the present invention are shown with reference to the drawing. In this context, the features mentioned may be provided either alone or in any combination.

BRIEF DESCRIPTION OF THE DRAWINGS

FIG. 1 is a schematic block diagram of an engine control;
FIG. 2 is a function diagram of an example embodiment of the operating method according to the present invention.

DETAILED DESCRIPTION

Figure 3:
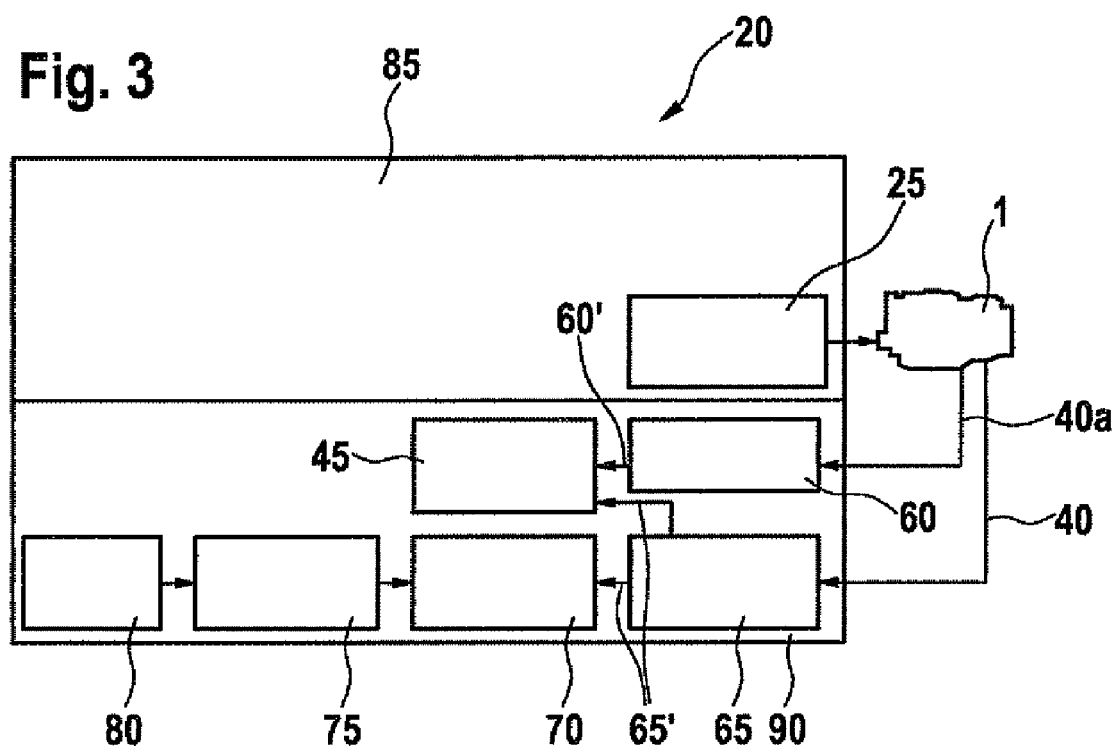
FIG. 3 is a function diagram of an example embodiment of the operating method according to the present invention.

In FIG. 1, reference numeral 20 denotes an engine control device for controlling an internal combustion engine 1, which is shown in FIGS. 2 and 3. Engine control device 20 may, for instance, be realized by a control device (not shown) of internal combustion engine 1, which includes a computer, a preferably electronic storage medium, as well as additional conventional components and these required to provide the method according to example embodiments of the present invention, and the rest of the control of internal combustion engine 1. Internal combustion engine 1 is driving a motor vehicle, for example.

According to FIG. 1, a driver-desired torque is transmitted to engine control device 20 by a driving pedal 45. Furthermore, one or several external torque demand(s) 50 may be supplied to engine control device 20, as shown in FIG. 1. For instance, external torque demands 50 may be generated by external vehicle functions, e.g., an anti-lock braking system, a traction control system, a vehicle cruise control or the like and forwarded to engine control device 20. A torque coordination then takes place in engine control device 20 in a conventional manner; a priorization of transmitted torque demands 50 and the driver-desired torque is implemented in order to determine a resulting setpoint torque that is to be implemented by internal combustion engine 1.

The setpoint torque is determined in a first level 85 of engine control device 20, as reproduced exemplarily by the function diagram shown in FIG. 2. First level 85, also denoted as functional level, is used to realize the entirety of functions required to operate internal combustion engine 1.

Using a setpoint-torque determination unit (not shown in FIG. 2), the desired setpoint torque for internal combustion engine 1 is formed. The setpoint torque is then conveyed to a torque model (likewise not shown in FIG. 2) and transformed there into a control period and/or a control start for at least one drive variable, in a conventional manner, as a function of performance variables 55 (FIG. 1) of internal combustion engine 1. The corresponding drive variables are represented by functional block 25 in FIG. 2.

Performance quantities 55 utilized to determine the drive variable(s) (FIG. 1) may be, for instance, a rotational speed of internal combustion engine 1, a temperature of internal combustion engine 1, an intake-manifold pressure, and so on. A fuel injection 5, an ignition angle 10, or also an air supply 15, for instance, is selected as at least one drive variable. If a diesel engine is involved, only fuel injection 5 is generally selected as drive variable. Especially in the case of an Otto engine, one or also several of the mentioned drive variables 5, 10, 15 may be selected to implement the setpoint torque.

If fuel injection 5 is used as drive variable, then a fuel quantity introduced into the combustion chamber of internal combustion engine 1 that is required to implement the setpoint torque, results from a corresponding control duration and the control start.

In the case of ignition angle 10, an ignition angle for firing the air/fuel mixture present in the combustion chamber that is required to implement the setpoint drive torque results from the control start.

In the case of air supply 15, a fresh-air charge in the combustion chamber that is required to implement the setpoint torque results from the control duration and the control start of a throttle valve, for example.

The control duration and the control start or possibly additional parameters of the at least one drive variable are formed in already described functional block 25 (FIG. 2) of functional level 85 of engine-control device 20 as a function of the specification of the torque model, which is not depicted and likewise disposed in functional level 85.

In a second level 90 of engine control device 20, also referred to as monitoring level, torque monitoring is implemented, which focuses on monitoring the torque actually output by internal combustion engine 1, the torque resulting from the control period and/or the control start of the at least one drive variable calculated in first level 85.

According to example embodiments of the present invention, an exhaust-gas temperature of internal combustion engine 1 is evaluated in monitoring level 90 of engine control device 20 in order to determine the instantaneous torque output by internal combustion engine 1 therefrom. To this end, the sensor signal of an exhaust-gas temperature sensor provided in, for example, an exhaust tract (not shown) of internal combustion engine 1, is forwarded to an actual-torque determination unit 65 assigned to monitoring level 90, which is symbolized by arrow 40 in FIG. 2. Using a corresponding characteristics curve or corresponding characteristics maps, which, for instance, may take additional performance variables 55 (FIG. 1) of internal combustion engine 1 into account, actual-torque determination unit 65 determines the instantaneous torque actually output by internal combustion engine 1 on the basis of exhaust-gas temperature signal 40 it received.

The instantaneous torque determined from the exhaust-gas temperature of internal combustion engine 1 is forwarded to a torque-comparison unit 70, which is likewise disposed in monitoring level 90 of engine control device 20. Torque-comparison unit 70 carries out a comparison between the instantaneous torque, determined from the exhaust-gas temperature, and a permissible torque.

The permissible torque is formed in a determination unit 75 also disposed in monitoring unit 90, for instance as a function of a redundant signal acquisition 80. The permissible torque may, for instance, be determined in a manner known to one skilled in the art as a function of the driver input at driving pedal 45. Redundant signal acquisition 80 is able to detect the driving-pedal position of driving pedal 45 in a redundant manner, preferably with the aid of two sensors.

As soon as the instantaneous torque determined from the exhaust-gas temperature of internal combustion engine 1 exceeds the permitted torque by a specifiable differential amount, an error response will be triggered. The described method ensures that errors internal to the control device or other errors in the region of engine control device 20 that lead to an undesired increase in the drive variables for internal combustion engine 1 formed in functional block 25, and thus to errors in the instantaneous torque actually output by internal combustion engine 1, are detected in a reliable manner. Torque-increasing errors that occur outside of engine control device 20 are also reliably detected by the afore-described method, because the instantaneous torque used for monitoring the torque is formed from a performance variable of internal combustion engine 1—i.e., the exhaust-gas temperature—that differs from the drive variable(s) used for internal combustion engine 1.

Example embodiments of the present invention recognize that the determination of the instantaneous torque actually output by internal combustion engine 1 and based on the exhaust-gas temperature of internal combustion engine 1 is especially precise because the corresponding measuring chain via the exhaust-gas temperature sensor is relatively short in comparison with an evaluation of an engine-speed signal, for example. The use of the method described herein therefore makes it possible to carry out especially precise torque monitoring of internal combustion engine 1 in monitoring level 90.

Particularly reliable torque monitoring may be achieved by redundant detection of the exhaust-gas temperature such as with the aid of two separate exhaust-gas temperature sensors.

An example embodiment of the method according to the present invention is described in the following text with reference to the function diagram shown in FIG. 3.

Analogously to engine control device 20 already described with reference to FIG. 2, one or several drive variable(s) for internal combustion engine 1 is/are also determined in engine control device 20 according to FIG. 3, in a functional block 25, which is disposed in functional level 85 of engine control device 20.

According to example embodiments of the present invention, in the engine control device 20 shown in FIG. 3, the instantaneous torque is not only determined from an exhaust-gas temperature 40 of internal combustion engine 1 described before with reference to FIG. 2, but additionally also on the basis of at least one further performance quantity of internal combustion engine 1 that differs from the drive variable formed by functional block 25. This additional performance quantity of internal combustion engine 1 may, for example, be an engine speed of internal combustion engine 1. For this purpose, a corresponding engine-speed signal 40*a* is conveyed to an engine-speed conditioning unit 60 disposed in monitoring level 90, which calculates instantaneous torque 60' output by internal combustion engine 1 from engine speed signal 40*a*, specifically by evaluating changes in the engine speed, for example.

As already described with reference to the variant of engine control device 20 shown in FIG. 2, instantaneous torque 65' output by internal combustion engine 1 is additionally determined in functional block 65 based on an exhaust-gas temperature signal 40. Instantaneous torques 60', 65' determined in redundant manner by functional blocks 60, 65, are advantageously transmitted to a plausibilization unit 45, which is disposed in monitoring level 90 in the exemplary embodiment described in FIG. 3. According to example embodiments of the present invention, plausibilization unit 45 carries out a plausibility check of instantaneous torque 65', determined as a function of the exhaust-gas temperature of internal combustion engine 1, on the basis of instantaneous torque 60' derived from an additional performance variable of internal combustion engine 1 such as, for example, the engine speed of internal combustion engine 1 in this instance.

If the plausibility check in plausibilization unit 45 indicates, for example, sufficient agreement between the two determined instantaneous torques 60', 65', then proper operation of internal combustion engine 1 is assumed. In addition, the torque comparison already described with reference to FIG. 2 is carried out by torque-comparison unit 70.

In the variant of engine control device 20 shown in FIG. 3, improper operation of internal combustion engine 1 may be detected in that, for one, the comparison carried out in torque-comparison unit 70 between instantaneous torque 65' determined from the exhaust-gas temperature of internal combustion engine 1, and a setpoint torque formed in the aforedescribed manner by functional block 75 indicates an excessive deviation between the setpoint torque and instantaneous torque 65' determined.

For another, engine control device 20 shown in FIG. 3 makes it possible to detect improper operation of internal combustion engine 1 in those instances where plausibilization unit 45 indicates an unsuccessful plausibility check. Such an unsuccessful plausibility check in plausibilization unit 45 may result if, for instance, instantaneous torque 65' determined as a function of the exhaust-gas temperature of internal combustion engine 1 deviates from instantaneous torque 60' beyond a specifiable measure that was determined from the engine speed of internal combustion engine 1.

The torque comparison in torque-comparison unit 70 also may be omitted in engine control device 20 according to FIG. 3, so that only the described plausibility check takes place in functional block 45.

In addition to evaluating the engine speed of internal combustion engine 1, it is also possible to analyze other performance variables of internal combustion engine 1 in functional block 60 for the purpose of obtaining an instantaneous torque value 60', on the basis of which instantaneous torque 65' determined from the exhaust-gas temperature of internal combustion engine 1 may be plausibilized.

In an example embodiment of the method according to the present invention, in addition to determining instantaneous torque 65' from the exhaust-gas temperature, it is specifically also possible to determine an additional instantaneous torque value 60' from the at least one drive variable of internal combustion engine 1, which is formed in functional block 25, as described. To this end, the particular drive variable is forwarded from functional block 25 to, for example, functional block 60. Functional block 60 is therefore able to determine additional instantaneous torque value 60' either from a performance variable 40*a* that differs from the drive variable, or directly from the drive variable(s) of functional block 25.

If additional instantaneous torque value 60' is determined from the drive variables, then an inverse torque model, which corresponds to the torque model that is used in functional level 85 to form the drive variables as a function of the setpoint torque, may advantageously be used.

It is possible to determine the instantaneous torque of internal combustion engine 1 from exhaust-gas temperature 40 and from at least one additional performance variable 40*a* that differs from the drive variable, as well as from at least one drive variable, and to use it accordingly for the plausibility check and/or for a setpoint-value comparison or a combination thereof.

The determination of instantaneous torque 65' as a function of the exhaust-gas temperature of internal combustion engine 1 need not necessarily take place in monitoring level 90 of engine control device 20, but may instead also be implemented directly in functional level 85 of engine control device 20. In this case, the instantaneous torque, for instance, may be determined within monitoring level 90 from the drive variables for internal combustion engine 1 with the aid of an inverse drive model.

In the operating method according to example embodiments of the present invention, an exhaust-gas temperature sensor (not shown) used to determine exhaust-gas temperature signal 40 is monitored for proper functioning in an especially advantageous manner, such monitoring taking place within monitoring level 90, for example. In an advantageous manner, it is specifically provided to initiate an error response as soon as a malfunction of the exhaust-gas temperature sensor is determined. Such an error response may, for instance, be initiated even if the removal of the exhaust-gas temperature sensor is determined.

An especially reliable variant of the operating method is provided in that the exhaust-gas temperature of internal combustion engine 1 is detected in redundant manner, for instance with the aid of two separate exhaust-gas temperature sensors. Consistent with the concept, realized in engine control device 20, of the first level, i.e., functional level 85, and the second level, i.e., monitoring level 90, which is separate therefrom, the signal of a first exhaust-gas temperature sensor may be analyzed in functional level 85, for instance, while the signal of a second exhaust-gas temperature sensor is evaluated in monitoring level 90.

The exhaust-gas temperature signals, which are available redundantly in this case, may in turn be transmitted to functional block 65, for example, which determines an instantaneous torque actually output by internal combustion engine 1 in the manner already described.

The operating method provides for monitoring of internal combustion engine 1 in particular with regard to the occurrence of torque-increasing errors such as the introduction of foreign matter, e.g., oil fog, into a combustion chamber of the internal combustion engine. Since instantaneous torque 65' is derived from an exhaust-gas temperature 40, a method for the precise determination of the instantaneous torque actually output by internal combustion engine 1 is advantageously provided, which allows a comprehensive plausibilization of the instantaneous torque with the aid of, among others, values for the instantaneous torque determined from additional performance variables of internal combustion engine 1.

What is claimed is:

1. A method for operating an internal combustion engine, comprising:
   controlling the internal combustion engine by at least one drive variable, wherein the at least one drive variable includes at least one of a fuel injection, an ignition angle, and an air supply;
   determining an instantaneous torque output by the internal combustion engine from a performance variable of the internal combustion engine;
   wherein, to determine the instantaneous torque, an exhaust-gas temperature of the internal combustion engine is used as the performance variable.

2. The method according to claim 1, wherein the internal combustion engine is arranged as an internal combustion engine of a motor vehicle.

3. The method according to claim 1, further comprising:
   additionally determining the instantaneous torque output by the internal combustion engine from at least one additional performance variable of the internal combustion engine, wherein the at least one additional performance variable includes at least one of engine speed of the internal combustion engine and intake-manifold pressure of the internal combustion engine.

4. The method according to claim 3, wherein the instantaneous torque, determined from at least one additional performance quantity of the internal combustion engine, is plausibilized using the instantaneous torque of the internal combustion engine determined as a function of the exhaust-gas temperature.

5. The method according to claim 1, wherein the instantaneous torque is monitored for agreement with a setpoint torque.

6. The method according to claim 4, wherein an error response is initiated at least one of (a) if the plausibilization is unsuccessful and (b) if a specifiable tolerated deviation of the instantaneous torque from the setpoint torque is exceeded.

7. The method according to claim 1, further comprising:
   additionally determining the instantaneous torque output by the internal combustion engine from the at least one drive variable of the internal combustion engine.

8. The method according to claim 1, wherein the exhaust-gas temperature is detected with the aid of at least one exhaust-gas temperature sensor, and an error response is initiated as soon as a malfunction of the exhaust-gas temperature sensor is determined.

9. The method according to claim 1, wherein the exhaust-gas temperature is detected redundantly with the aid of multiple exhaust-gas temperature sensors.

10. A system, comprising:
    a control device for an internal combustion engine, wherein the control device is adapted to perform a method including:
      controlling the internal combustion engine by at least one drive variable, wherein the at least one drive variable includes at least one of a fuel injection, an ignition angle, and an air supply;
      determining an instantaneous torque output by the internal combustion engine from a performance variable of the internal combustion engine;
      wherein, to determine the instantaneous torque, an exhaust-gas temperature of the internal combustion engine is used as the performance variable.

11. The system according to claim 10, wherein the internal combustion engine is arranged as an internal combustion engine of a motor vehicle.

\* \* \* \* \*